United States Patent [19]
Garrison et al.

[11] Patent Number: 5,910,945
[45] Date of Patent: Jun. 8, 1999

[54] METHOD AND APPARATUS FOR SYNCHRONIZING COMMUNICATIONS IN A SATELLITE BASED TELECOMMUNICATIONS SYSTEM

[75] Inventors: Arthur L. Garrison, Redondo Beach; Terrence R. Smigla; Scott A. Stephens, both of Manhattan Beach, all of Calif.

[73] Assignee: TRW Inc., Redondo Beach, Calif.

[21] Appl. No.: 08/643,120

[22] Filed: Apr. 30, 1996

[51] Int. Cl.[6] .................................................. H04J 3/06
[52] U.S. Cl. .................... 370/324; 370/331; 370/350; 370/509; 370/516
[58] Field of Search .................................. 370/324, 331, 370/350, 507, 509, 516

[56] References Cited

U.S. PATENT DOCUMENTS

| | | | |
|---|---|---|---|
| 5,625,640 | 4/1997 | Palmer et al. | 375/202 |
| 5,638,361 | 6/1997 | Ohlson et al. | 370/342 |
| 5,659,545 | 8/1997 | Sowles et al. | 370/324 |
| 5,661,724 | 8/1997 | Chennakeshu et al. | 370/324 |
| 5,664,006 | 9/1997 | Monte et al. | 455/405 |

*Primary Examiner*—Min Jung
*Attorney, Agent, or Firm*—Michael S. Yatsko

[57] ABSTRACT

A method and apparatus are provided, for maintaining synchronous return and forward communications links between user terminals and earth stations communicating via a common satellite in a satellite based telecommunications system. Each user terminal maintains a closed synchronization loop with its associated earth station based on timing and frequency error offset signals received by the user terminals. The user terminals update their internal timing and frequency generators based on the received error offset signals. In an earth station sharing embodiment, one of the earth stations is designated as a master earth station while the remaining stations are designated as slave earth stations with respect to a common satellite. The slave earth stations monitor a return link between at least one user terminal and the master earth station. The slave earth stations update their internal reference timing and frequency signal generators, in order to remain synchronous with the return link between the monitored user terminal and the master earth station. The slave earth stations maintained synchronous forward links by requesting synchronization update information from the monitored user terminal. Upon receiving a request, the monitored user terminal calculates a difference in timing and frequency between frames received from the requesting slave and associated master earth stations. The user terminal transmits the difference in timing and frequency along its return link.

24 Claims, 7 Drawing Sheets ved carrier frequency of the receiver increases as the satellite moves toward a user terminal and decreases as the satellite moves away from the user terminal. If not corrected, Doppler induced frequency shifts and timing misalignment create co-channel interference between transmissions received from multiple user terminals. Thus, the user terminals continuously adjust the carrier frequency and timing of outgoing transmissions to ensure that the perceived carrier frequency and timing at the assigned earth station receiver equals the assigned carrier frequency and timing for the user terminal. A need remains for accurately maintaining the forward and. return links between an earth station and user terminal.

METHOD AND APPARATUS FOR SYNCHRONIZING COMMUNICATIONS IN A SATELLITE BASED TELECOMMUNICATIONS SYSTEM

FIELD OF THE INVENTION

The present invention generally relates to a satellite based telecommunication system. More specifically, the present invention relates to synchronization of forward and return communications links between user terminals and earth stations.

BACKGROUND OF THE INVENTION

Satellite based telecommunications systems have been proposed for enabling user terminals to communicate with one another and with an existing public telephone switching network (PSTN). The user terminals interconnect with one another and with the public telephone network through earth stations strategically located at predefined geographic positions about the earth.

The proposed systems utilize a constellation of telecommunications satellites for relaying communications signals between the user terminals and earth stations. These communications signals pass along predefined channels uniquely assigned to each user terminal Each channel includes a forward link along which an earth station transmits RF signals to a mobile terminal and a return link along which the user terminal transmits RF signals to the earth station. Each communications link passes through a corresponding satellite which functions as a "bent pipe" and retransmits all received communications to the corresponding earth station or user terminal.

Typically, satellite based telecommunications systems utilize one or more coding techniques to enhance the system capacity. For instance, the system may employ frequency division multiple access (FDMA) coding, time division multiple access (TDMA) coding, code division multiple access (CDMA) coding, or any combination of FDMA, TDMA, and CDMA coding. In general, to maximize system capacity, the earth station synchronizes in frequency and timing each return link assigned thereto in order to prevent interference between transmissions emitted from different user terminals. To maintain synchronization, the transmissions from multiple user terminals must be emitted at predefined times to ensure that the transmissions are received by a common earth station simultaneously Variations in timing result as the distance varies between a coverage satellite and a transmitting user terminal. By way of example, as the distance increases between a satellite and transmitting user terminal, the transmission arrives later in time at the earth station. Divergently, as the distance decreases between a satellite and transmitting user terminal, the transmission arrives earlier in time. To account for such range variations, the user terminals are controlled to retard and advance the starting times for data transmissions (i.e, frames of communications data) to ensure that frames from multiple user terminals assigned to a common earth station arrive at the earth station simultaneously.

In addition, each earth station controls user terminals assigned thereto in order to ensure that the return link remains centered about an assigned carrier frequency (i.e., sub-band) as received at the earth station. The center frequency of each transmission from a user terminal experiences frequency changes due to the Doppler effect. The Doppler effect occurs due to the fact that a satellite continuously moves relative to a transmitting user terminal. The perceived carrier frequency of the receiver increases as the satellite moves toward a user terminal and decreases as the satellite moves away from the user terminal. If not corrected, Doppler induced frequency shifts and timing misalignment create co-channel interference between transmissions received from multiple user terminals. Thus, the user terminals continuously adjust the carrier frequency and timing of outgoing transmissions to ensure that the perceived carrier frequency and timing at the assigned earth station receiver equals the assigned carrier frequency and timing for the user terminal. A need remains for accurately maintaining the forward and. return links between an earth station and user terminal.

Moreover, a need remains to facilitate handovers. Throughout transmission, satellites continuously orbit the earth. The user terminals may also move. Consequently, a communications link with a user terminal may need to be transferred or handed over from one earth station to another earth station. When a handover occurs, the user terminal must be changed to a new channel in which it establishes new forward and return links between the user terminal and the new earth station. This adjustment includes changing the timing of the user terminal to align with the new earth station's reference time. The user terminal transmitter must also shift to a new carrier frequency. A need exists to facilitate quick and reliable handovers by minimizing the time needed to achieve synchronized forward and return links with the new earth station.

Moreover, past systems have been unable to provide earth station sharing wherein multiple earth stations communicate with a user terminal at the same time through a common satellite. Earth station sharing requires timing and frequency alignment at the common user terminal of RF signals from both earth stations. Such alignment is complicated due to the presence of differing earth station to satellite path links and Doppler variations. Also, existing systems have been unable to provide return link synchronization with earth station sharing in which user terminals commmunicate in a common subband through a common satellite to multiple earth stations. To do so, the received communications signals must be aligned in time and frequency at any earth station receiving such signals.

A need remains within the industry for an improved telecommunications system capable of maintaining synchronization between multiple user terminals and sharing earth stations. It is an object of the present invention to meet this need.

SUMMARY OF THE INVENTION

It is an object of the present invention to provide return link synchronization to accurately align multiple user terminals in time and frequency, at a common earth station notwithstanding the differing user to satellite ranges and Doppler shifts.

It is another object of the present invention to provide forward link synchronization with earth station sharing between multiple earth stations which transmit communications to a common user terminal at the same frequency.

It is a corollary object of the present invention to provide forward link synchronization at a single user terminal which receives transmissions from multiple earth stations through a common satellite notwithstanding differences in the earth station to satellite range and Doppler effect.

It is yet a further object of the present-invention to provide return link synchronization between a user terminal and multiple shared earth stations.

It is a corollary object of the present invention to align, in timing and frequency, at each of a plurality of earth stations transmissions from a user terminal transmitted at a common frequency through a common satellite to the plurality of earth stations.

These and other objects are provided by a method and apparatus for maintaining synchronous return and forward communications links between a set of user terminals and at least two earth stations communicating with the user terminals via a common satellite in a satellite based telecommunications system. Each user terminal maintains a closed synchronization loop with its assigned earth station. The user terminals update their internal timing and frequency based on the received error offset signals in order to maintain a synchronous return link with the associated earth station. In an alternative embodiment, one of the earth stations is designated as a master earth station while the remaining stations are designated as slave earth stations. The slave earth stations monitor at least one user terminal assigned to the master earth station. Based upon a timing and frequency of the monitored return link, the slave earth stations update their internal reference timing and frequency, in order to remain synchronous with the return link between the monitored user terminal and the master earth station. The slave earth stations maintain synchronous forward links by requesting synchronization update information from the monitored user terminal. Upon receiving a request, the monitored user terminal calculates a difference in timing and frequency between RF signals received from the requesting slave and RF signals from the master earth station. The user terminal transmits this difference along its return link. The slave earth station, while monitoring the return link, updates its forward timing and frequency generators to maintain its forward links synchronous with those of the master earth station.

DETAILED DESCRIPTION OF THE PREFERRED EMBODIMENT

Figure 1:
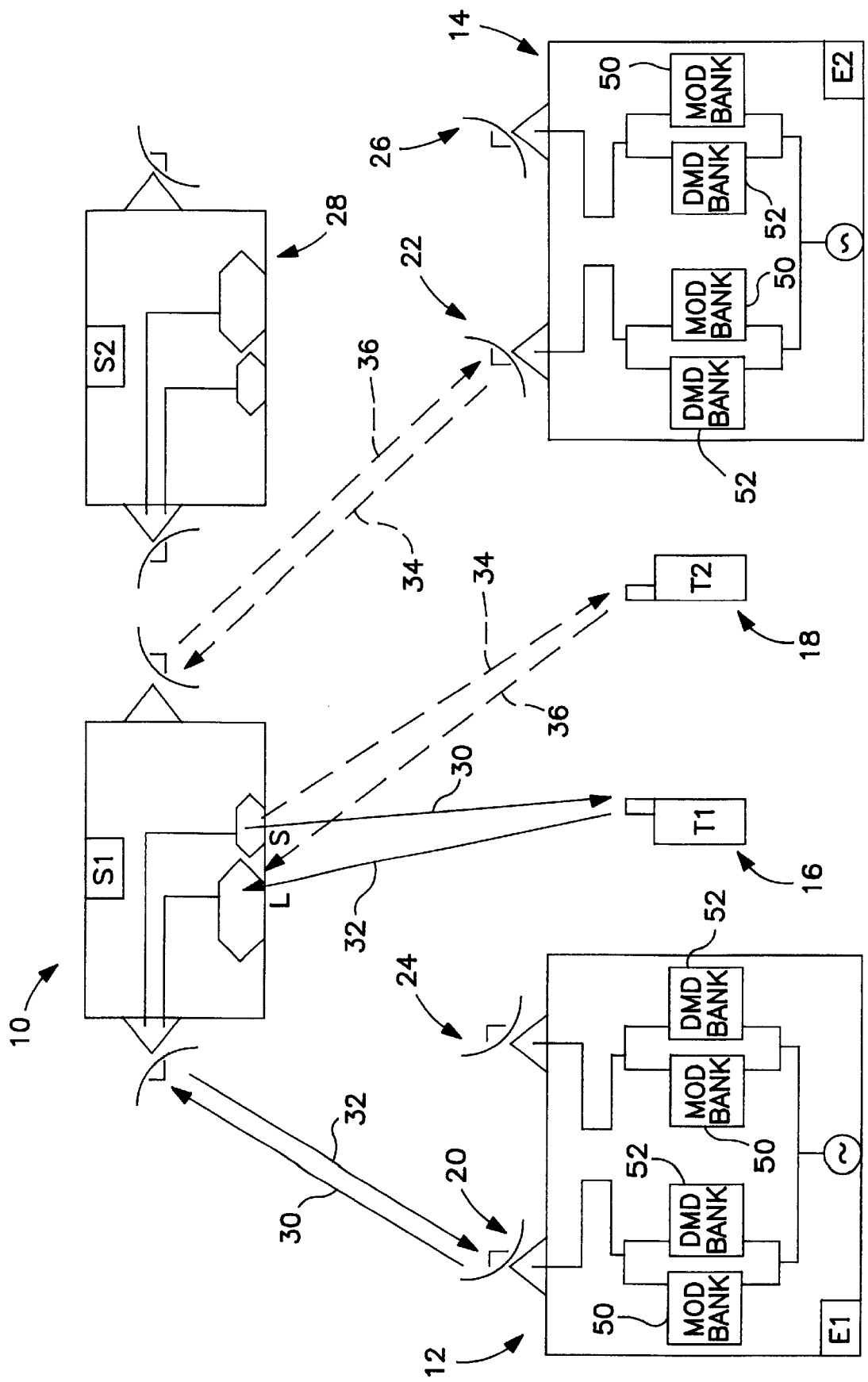
FIG. 1 generally illustrates a satellite subsystem having two earth stations communicating with separate user terminals.

FIG. 1 generally illustrates a sub-section of a satellite based telecommunications system including a satellite 10, earth stations 12 and 14 and user terminals 15 and 18. Earth stations 12 and 14, include antennas 20 and 22 for tracking the satellite 10. Additional antennas 24 and 26 are provided for tracking a second satellite 28. Earth station 12 communicates with user terminal 16 via a forward link 30 and a return link 32. The forward and return links 30 and 32 pass through the satellite 1a which functions as a bent pipe to retransmit all communications received. Earth station 14 communicates with user terminal 18 via forward and return links 34 and 36, respectively The earth stations and user terminals pass communications data and command information along the forward and return links in sequential discrete frames.

Figure 2:
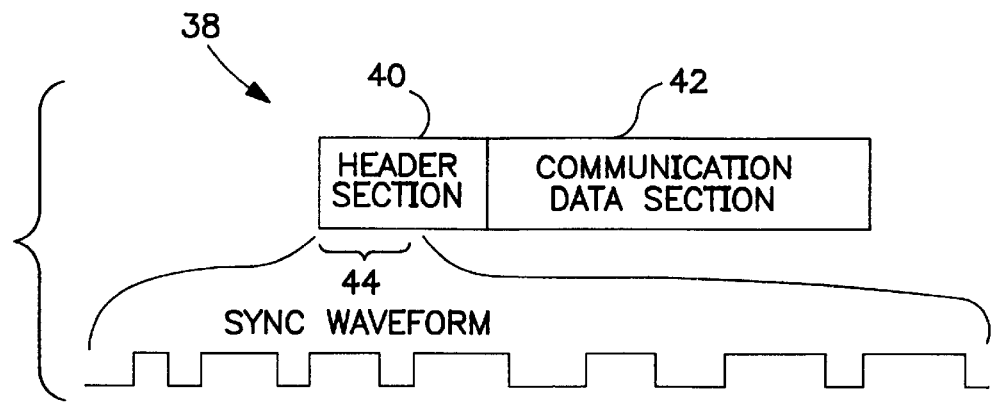
FIG. 2 illustrates an exemplary data structure for a frame of communications data, along with an exemplary synchronization waveform for use therein.

FIG. 2 illustrates an exemplary format for a communications frame 38. The frame 38 may include a header section 40 followed by a data section 42. The data section 42 may include telecommunications data and/or commands, while the header section 40 may include a synchronization field having synchronization information necessary to maintain synchronous communications along the forward and return links 30-36. The header and data sections 40 and 42 may be configured in a variety of formats. For instance, the data section may include one or more PN codes, CDKA codes and similar signature waveforms which uniquely identify user terminals to which or from which the data is directed Communications data may be modulated with the signature waveform of the user terminal transmitting or intended to receive the data. A frame 3S transmitted from a user terminal 16 only contains communications data related to that user terminal and accordingly, the data section 42 includes data modulated with the single corresponding signature waveform. A frame 38 transmitted by an earth station may include communications data sets directed to multiple user terminals. If so, the data section 42 is assembled by superimposing multiple data signals upon one another. Each data signal is modulated with a corresponding unique user terminal signature waveform to provide a composite communications data signal.

The header section 40 may include a sync field 44 configured to hold one or more synchronization waveforms. As explained above for the data section 42, frames transmitted by a user terminal include a single unique synchronization waveform Frames transmitted from earth stations may include multiple synchronization waveforms superimposed upon one another within the Ls sync field 42 Each synchronization waveform corresponds to a signature waveform and communications data set in the data section 44.

The preferred embodiment of the present invention utilizes synchronous communications links in the forward and return directions Communications signals are considered "synchronous" when the transmitter is controlled to ensure that a frame of communications data is received at a predefined point in time and at the nominal carrier frequency. With reference to FIG. 1, the forward link 30 from earth station 12 is considered to be synchronous since the earth station 12 transmits superimposed communications data for multiple user terminals 16 and 18 in a single frame. The overlapping data is aligned or "synchronized" within the communications data section 42. The return links 32 and 36 are considered synchronous when multiple user terminals, such as terminals 16 and 18, are controlled to transmit frames of communications data such that both frames are received simultaneously by the earth station 12 and synchronous with respect to a reference time and frequency.

Returning to FIG. 1, the earth stations 12 and 14 include modulator and demodulator banks 50 and 52 respectively. The demodulators in bank 52 operate to separate communications data for each desired user terminal from the composite communications frame. The modulator bank 50 operates to combine, into a composite frame, communications data for multiple user terminals.

Single Earth Station Return Link Synchronization

Figure 3:
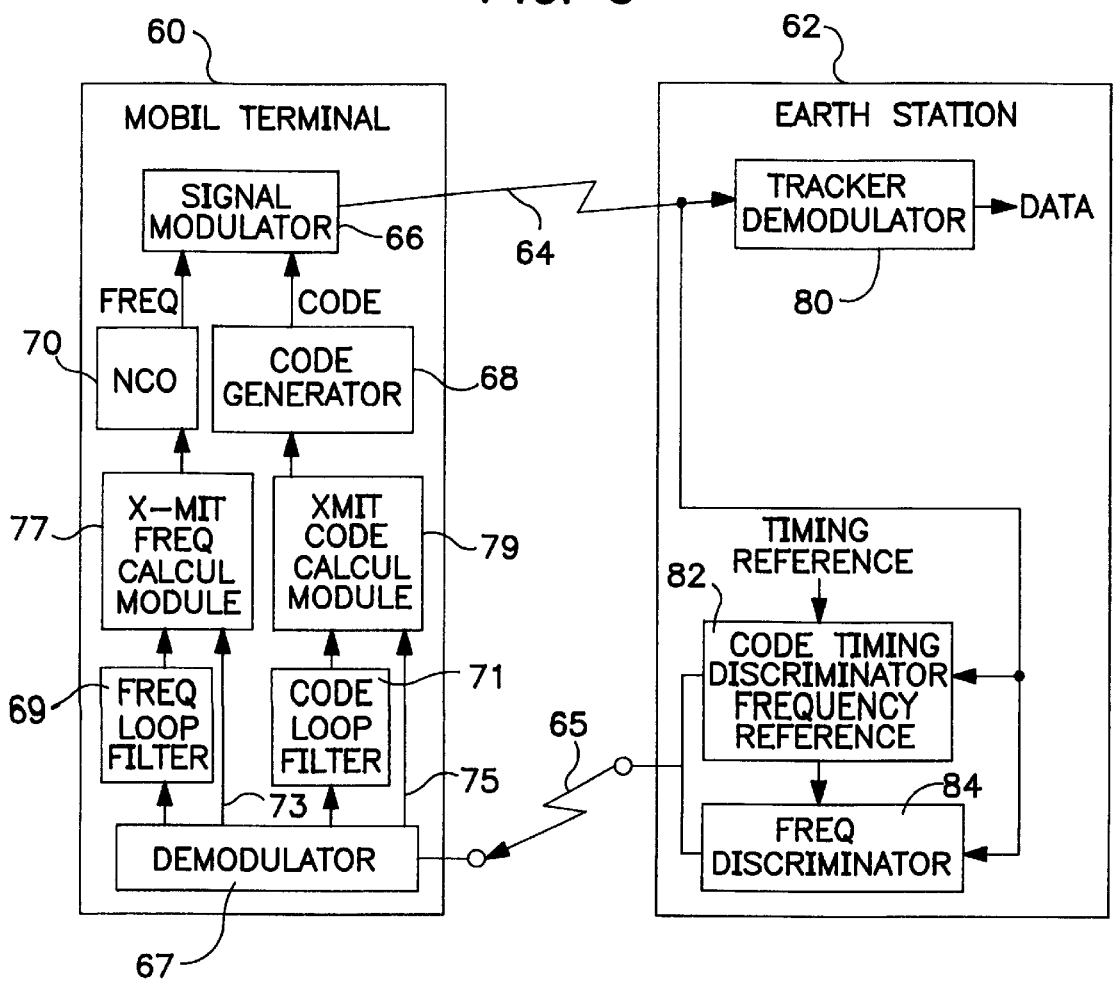
FIG. 3 illustrates a block diagram of the components of a user terminal and earth station utilized in connection with return link synchronization.

Next, the discussion is turned to FIG. 3 which illustrates the components of a user terminal 60 and earth station which cooperate to maintain a synchronous return link 5a therebetween. While not illustrated in FIG. 3, it is understood that the return link 64 progresses via a satellite. The user terminal 60 includes a demodulator 67 which locks onto and tracks an incoming RF signal received from forward link (FL) 65. The demodulator 67 demodulates the incoming RF signal to obtain encoded frequency and timing error offset signals therefrom The encoded frequency and timing error offset signals are embedded in the incoming RF signal as explained below. The demodulator 67 effects demodulation based on an estimated RF carrier frequency and an estimated timing (e.g, code chip timing) with respect to the user terminal's reference oscillator (not shown). The reference oscillator generates reference signals upon which all modulation and demodulation are based. The demodulator estimated frequency and timing are output along lines 73 and 75, respectively, to transmission frequency and code calculation modules 77 and 79, respectively. The demodulator 67 outputs the encoded frequency and timing error offset signals to frequency and code loop filters 69 and 71, respectively. Optionally, the error signals may represent bit streams. The frequency and code loop filters 69 and 71 may output average values for a plurality of received error offset signals. The outputs of the loop filters 69 and 71 are delivered to the transmission frequency and code calculation modules 77 and 79, respectively The frequency and code calculation modules 77 and 79 combine corresponding input frequencies and chip timing codes to correct for Doppler shifts and range variations between the satellite and the user terminal Optionally, the frequency and code calculation modules 77 and 79 may combine corresponding input signals to correct for error within the modulation/demodulation reference oscillator of the user terminal By way of example only, the frequency and code calculation modules 77 and 79 may produce sums of, or differences between, corresponding inputs. The frequency and code calculation modules 77 and 79 output the frequency and coding signals to the oscillator 70 and code generator 68, respectively.

The user terminal 60 also includes a signal modulator 66 which transmits communications frames (structured as shown in FIG. 2). The modulator 66 operates at a carrier frequency defined by the oscillator 70 and at a chip timing defined by the code generator 68. The oscillator 70 may adjust its output carrier frequency based on the output of transmission frequency calculation module 77. Optionally, the modulator 66 may combine outgoing communications data with a signature waveform produced by the waveform generator 68. A modulated combination of the data and signature waveform may be transmitted in the communications data section 42 of a frame. In addition, the waveform generator 68 may produce a synchronization waveform which is inserted into the sync field of the header section 40 of the frame 38. The synchronization waveform may be part of, or separate from, the signature waveform. The generator 68 produces the sync and signature waveforms based on the output of the transmission code calculation module 79. These components cooperate to retard or advance the transmission starting time for each frame 38 and to define the central carrier frequency and corresponding sub-band within which the communications frame 38 is transmitted over the return link 64.

As explained above, it is necessary to continuously adjust the timing and carrier frequency in order to maintain synchronized communications. The user terminal and earth station of FIG. 3 maintain synchronization through a closed loop control process whereby the earth station 62 continuously provides, via the forward link 65, timing and frequency update information. The earth station 62 includes at least one demodulator 80 to demodulate the composite communications signal within the communications section of each frame 38. The demodulator 80 outputs the communications data transmitted by user terminal 60 based on the signature waveforms imbedded within the received RF signal.

While the incoming RF signal may include multiple data and sync waveforms from an equal number of user terminals, the following explanation is only provided with respect to a single user terminal. The following process and structure merely need be repeated for the portion of the RF signal corresponding to other user terminals.

The earth station 62 includes timing and frequency discriminators 82 and 84. The timing discriminator 82 compares the sync waveform from the sync field ii of each frame with a timing reference signal to obtain a timing offset error therebetween. The timing offset error represents the amount by which the synchronization waveform in the received sync field varies, in time, from the timing reference signal. This offset error represents the amount by which the user terminal must advance or retard its timing to properly align subsequent frames with the reference time of the earth station 620 The code timing discrimination may be effected through auto correlation of the reference and received timing signals, such as through calculating the dot product of the received and reference signals and the like.

A frequency discriminator 84, compares the received synchronization waveform with a frequency reference signal to determine the amount by which the received signal in return link 64 has shifted from the assigned carrier frequency (i.e, assigned sub-band) Frequency discrimination may be effected through a variety of known techniques, such as by converting the received and reference signals to the frequency domain and comparing phase shifts therebetween. The frequency discriminator 84 generates a frequency error offset representing the amount by which the user terminal 60 must shift its carrier frequency to properly align the return link 64 within its assigned sub-band centered about its assigned carrier frequency.

The timing and frequency error offsets are transmitted via a forward link 65 (through a satellite not shown) to the user terminal 60. The timing and frequency error signals are delivered to code and frequency filters 69 and 71. The filters 74 and 76 may receive multiple error signals through forward link 65 and separately average multiple timing and frequency error signals. The averages of the timing error signals are supplied to the code generator 68. The average of the frequency error signals are supplied to the oscillator 70. The oscillator 70 and generator 68 adjust the carrier frequency and timing by an amount equal to the received error offsets. In this manner, the user terminal 60 retains a synchronized return link 64 with its associated earth station 62.

The foregoing path between the user terminal 60 and earth station 62 represents an active closed loop architecture to correct for propagation delays and Doppler effects unique to the transmitting user terminal 60. This timing and frequency correction process is performed independently for each user terminal communicating with the earth station 62. In this manner, all frames arriving at the earth station are aligned in time and frequency.

Return Link Synchronization With Earth Station Sharing

Figure 4:
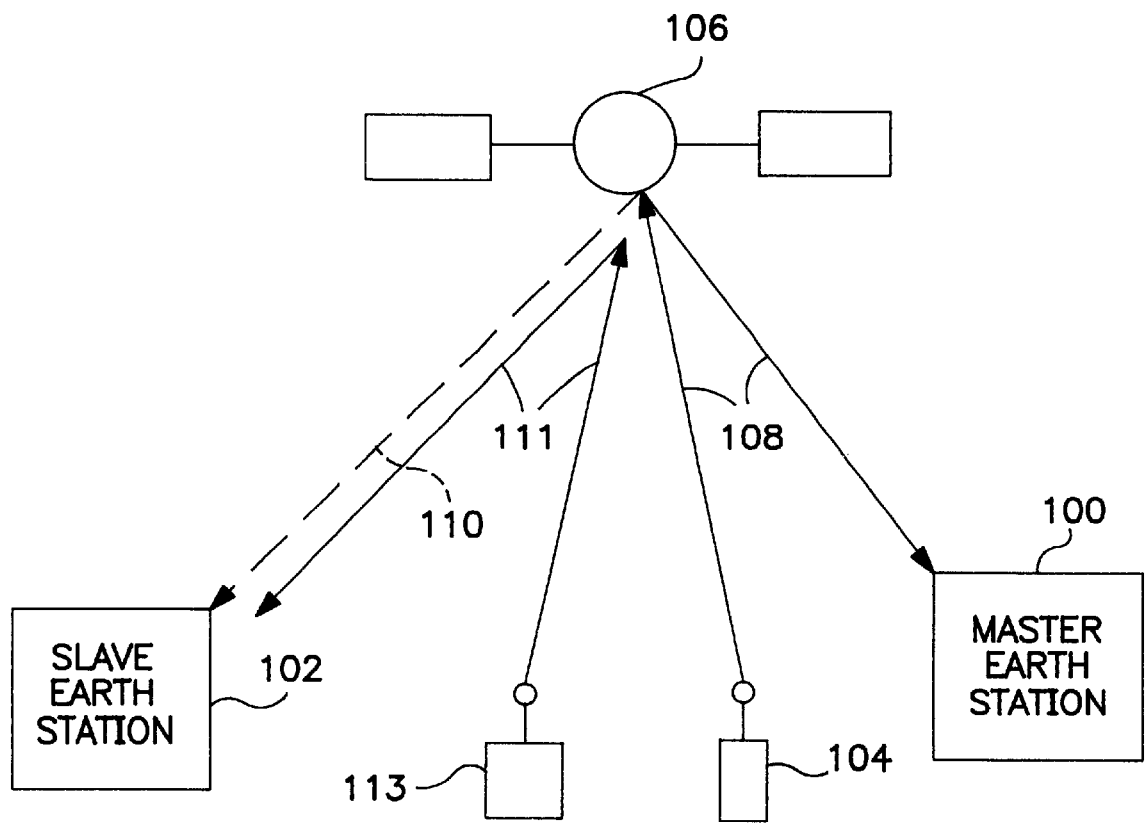
FIG. 4 illustrates an alternative embodiment for maintaining return link synchronization between multiple earth stations with respect to a common user terminal.
Figure 5:
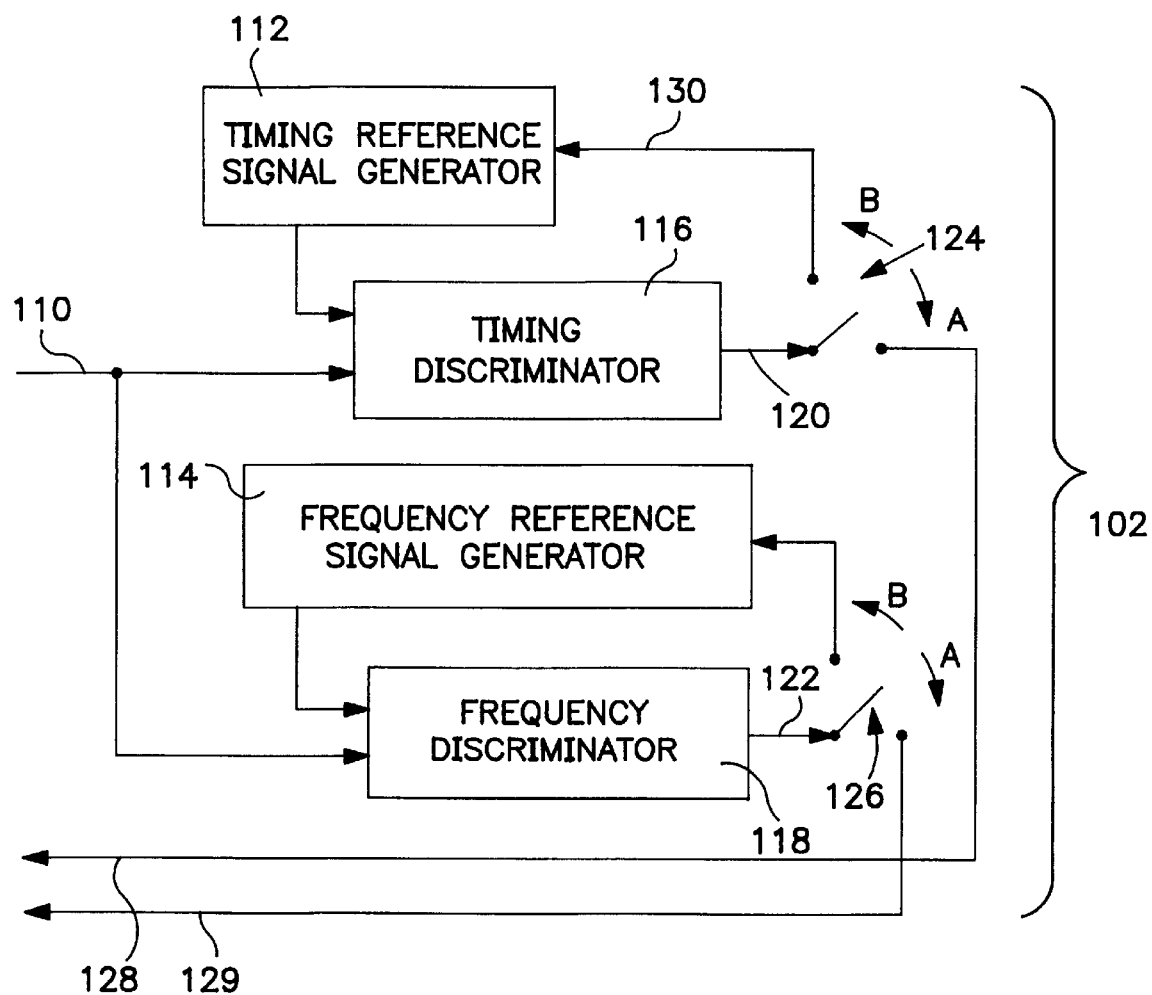
FIG. 5 illustrates a block diagram of a timing and frequency control subsection of the slave earth station illustrated in FIG. 4.
Figure 6:
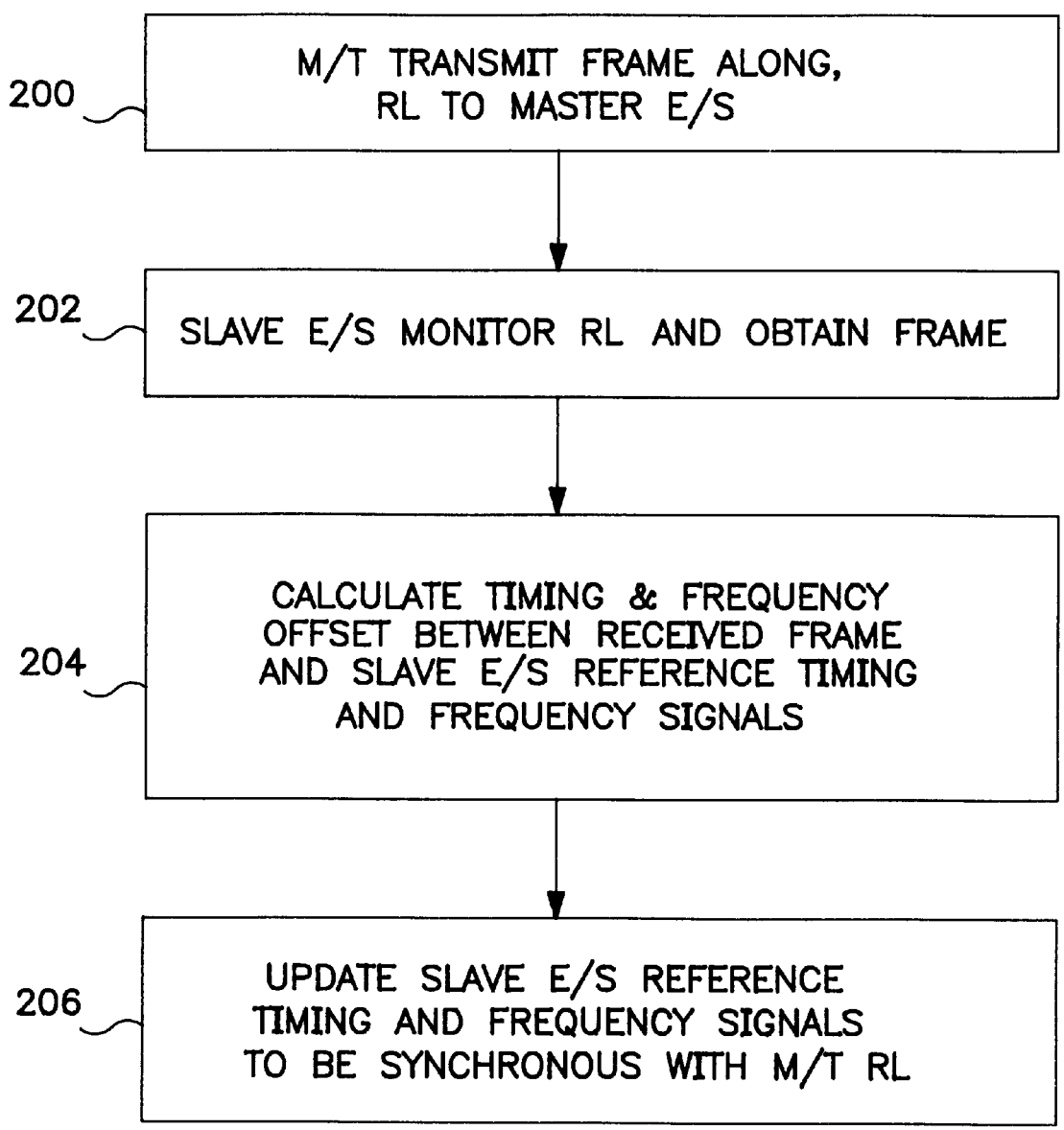
FIG. 6 illustrates a flow process carried out when achieving return link synchronization.

FIGS. 4–6 illustrate an alternative embodiment in which return link synchronization is maintained between multiple earth stations.

A system controller (not shown) assigns one master earth station to each satellite 106, while all other earth stations covered by the satellite operate as slave earth stations with respect to this common satellite. As satellites orbit, they cover different earth stations. The master earth station is reassigned for a satellite each time the satellite's coverage area moves beyond its previous master earth station. Once assigned, an earth station may remain as the master earth station for a given satellite until the coverage area passes beyond the master earth station An earth station may be assigned as the master earth station based on several criteria, such as geographic location, duration within the satellite's field of view (coverage area), access to the public switching telephone network, and the like. Once a master earth station is assigned to a satellite, all other earth stations entering and leaving that satellite's field of view are slaves. This assignment is performed separately with respect to each satellite. Thus, while in an overlap region between multiple satellites, an earth station may be a slave with respect to one satellite and simultaneously a master with respect to another satellite.

FIG. 4 illustrates master and slave earth stations 100 and 102 which have been assigned in connection with a common satellite 106. The master earth station 100 receives communications from a user terminal 104 via a return link 108. The slave earth station 102 continuously monitors the return link 108 (as illustrated by dashed line 110).

The satellite 106 transmits RF signals received from user terminal 104 along the feeder links to all earth stations in the satellite's field of view. While the user terminal 104, may only retain a forward link 108 with the master earth station 100, the RF signals are transmitted by the satellite toward all slave earth stations By monitoring return link 108, the slave earth station 102 is able to intercept RF signals traveling to the master earth station 100 As explained below in connection with FIGS. 5 and 6, the slave earth station 102 updates its internal timing and frequency reference signals to maintain synchronization with the return link 108 of the user terminal 104.

FIG. 5 illustrates a subsection of the slave earth station 102 which operates in connection with shared return link synchronization. The RF signals passed along return link 108 are received on line 110 and supplied to timing and frequency discriminators 116 and 118. The discriminators 116 and 118 compare the received communication signal on line 110 with reference signals from timing and frequency signal generators 112 and 114 to obtain timing and frequency offset error signals which are output at lines 120 and 122. The timing and frequency offset error signals are delivered to switches 124 and 126. When switched to a user terminal forward link synchronization position in the direction of arrows A, the timing and frequency offset error signals are delivered along lines 128 and 129. As explained above in connection with FIG. 3, the offset error signals are delivered along a forward link (65 in FIG. 3) to resultant user terminals to synchronize the return link 64. However, when performing earth station shared return link synchronization, the switches 124 and 126 are rotated in the direction of arrows B to connect with input lines 130 and 132 which deliver the offset error signals to corresponding return link timing and frequency signal generators 112 and 114. The timing and frequency reference signal generators 112 and 114 are updated based upon the incoming error offset signals on lines 130 and 132 such that the signal generators produce timing and frequency reference signals synchronized with the incoming timing and frequency received on line 110.

The timing and frequency reference signal generators 112 and 114 control the timing and carrier frequency of outgoing frames transmitted by the user terminal 113 along a return link 111 to the assigned slave earth station 102. Thus, as the generators 112 and 114 adjust to align with the received timing and frequency of the RF signal from user terminal 104, they similarly align return link 111 from user terminal 113.

FIG. 6 illustrates the return link synchronization process. At step 200, the user terminal 104 transmits a communications frame along the return link 108 (FIG. 4) to the master earth station 100. This communications frame is monitored by the slave earth station 102 via link 110 (at step 202). Next, the slave earth station calculates the timing and frequency offsets (within discriminators 116 and 118) between the received frame and the slave earth station's reference timing and frequency signals (step 204) from generators 112 and 114. At step 206, when the switches 124 and 126 are moved in the direction of arrows B, the slave earth station updates its reference timing and frequency generators 112 and 114 to be synchronous with the received RF signal of return link 108.

It is understood that, once the slave earth station adjusts its return link timing and frequency reference generators, the slave earth station subsequently adjusts return link synchronization of all user terminals (113) assigned thereto In this manner, the subsystem of earth stations and user terminals serviced by satellite 106 are synchronized with respect to a single master earth station 100. This synchronization sequence is carried out by first synchronizing the return link 108 of the user terminal 104 with the master earth station 100. Thereafter, the slave earth station 102 adjusts its timing and frequency return link reference signals to be synchronous with the return link 108. Subsequently, the slave earth station 102 instructs the user terminal 113 assigned to the slave earth station 102 to adjust its return link timing and frequency in order to be synchronous with the updated timing and frequency reference signal generators 112 and 114 Ultimately, the return link user terminal 113 assigned to the slave earth station 102 becomes synchronous with the return link 108 to master earth station 100.

Forward Link Synchronization With Earth Station Sharing

Figure 7:
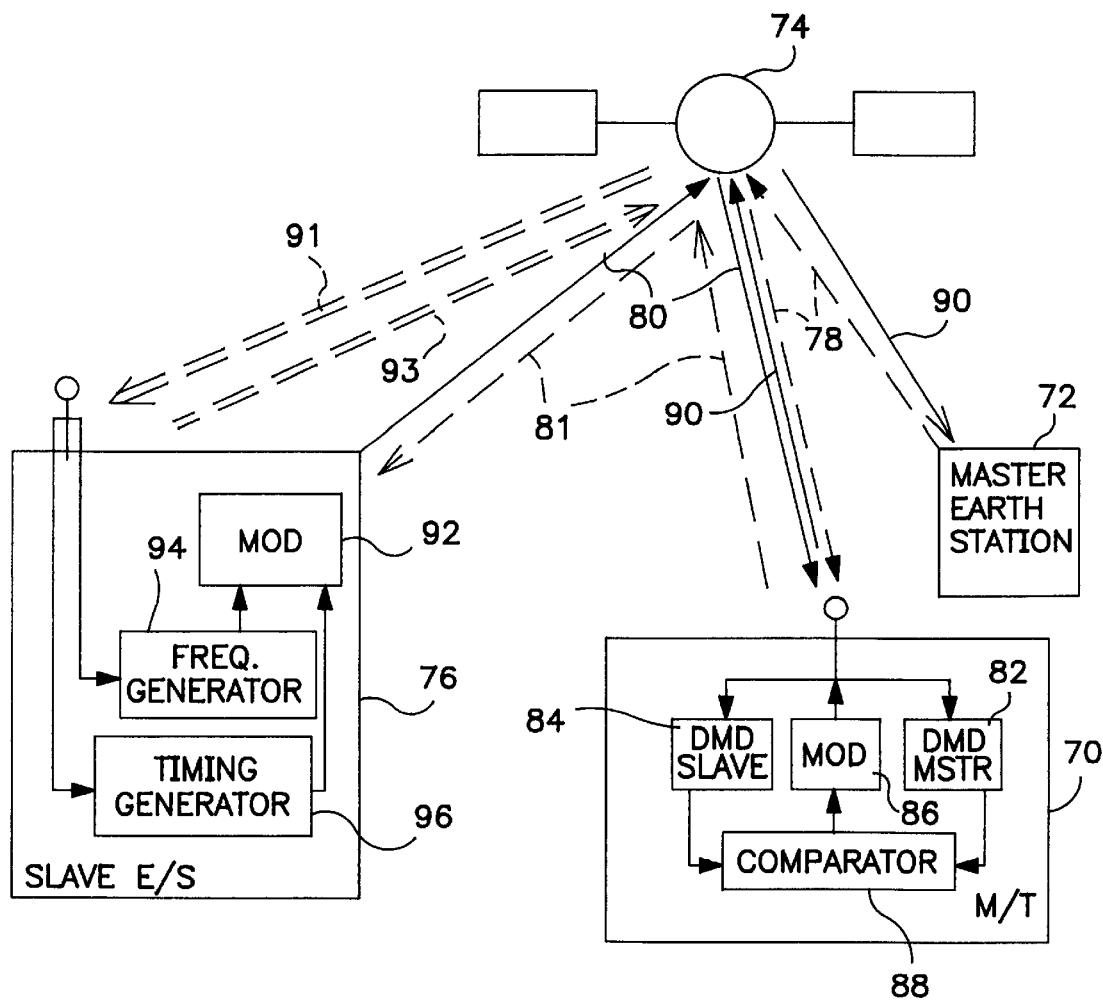
FIG. 7 illustrates an alternative embodiment in which synchronization is maintained within forward links between a common user terminal and master and slave earth stations.
Figure 8:
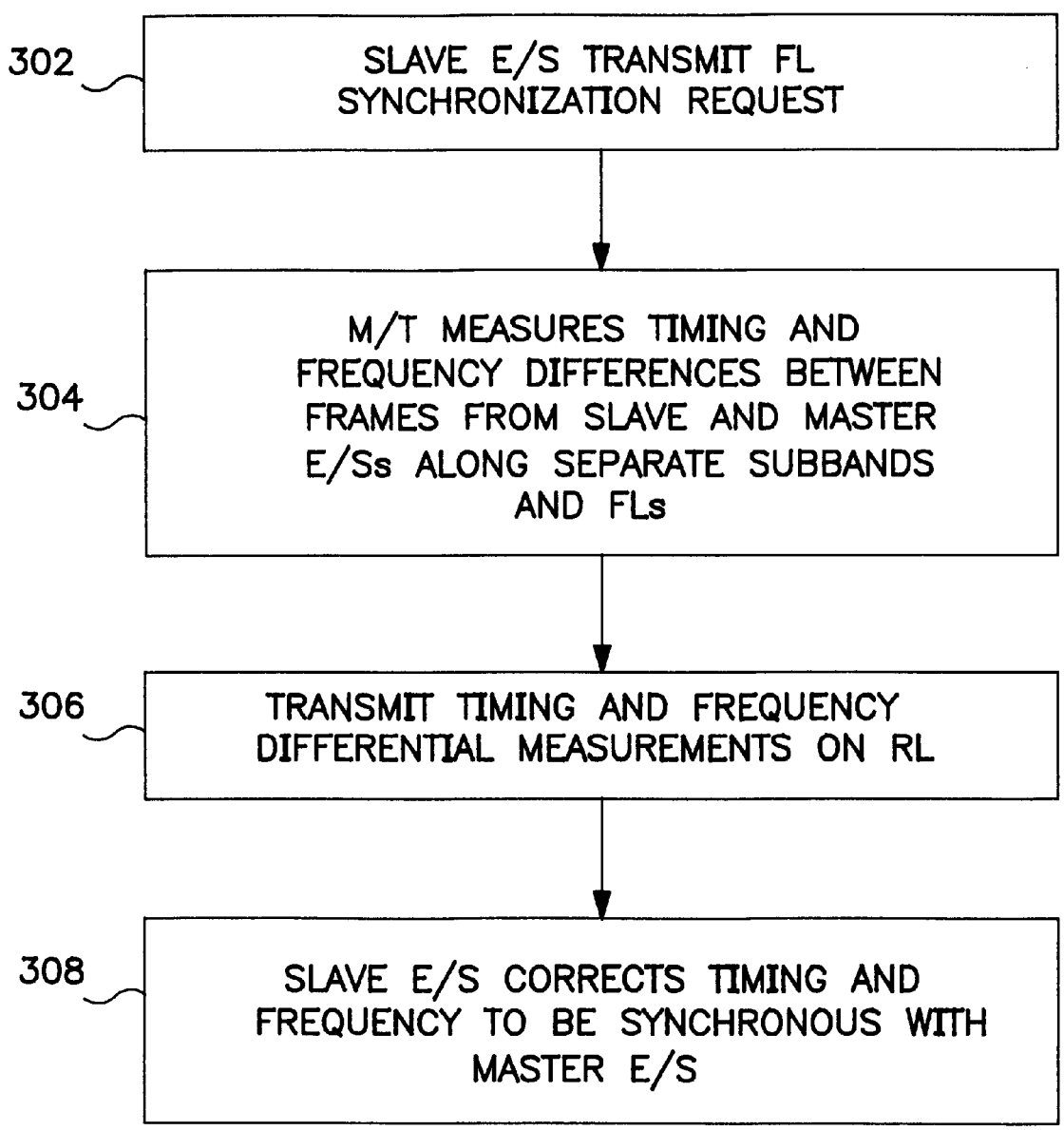
FIG. 8 illustrates the process carried out during forward link synchronization according to the embodiment of FIG. 7.

FIG. 7 illustrates an alternative embodiment in which forward links from multiple earth stations 72 and 76 in a common satellite's 74 field of view are synchronized. The earth stations 72 and 76 transmit to the user terminal 70 via forward links 78 and 80. The user terminal 70 transmits along a return link 90 which is received by earth stations 72 and 76. While the embodiment illustrated in FIG. 7 shows forward and return links between earth stations 72 and 76 and the common user terminal 70, the user terminal 70 maintains a single communications link at any given instant. In the example of FIG. 7, the user terminal 70 and earth station 72 maintain forward and return communications links 78 and 90 until the user terminal 70 is handed off to earth station 76. Upon completion of the handoff, user terminal 70 only maintains forward and return links 80 and 81 with the earth station 76. While forward and return links 78 and 90 are maintained with earth station 72, the earth station 76 monitors the return link 90 (as shown by line 91).

As explained above in connection with FIG. 4, the earth stations are configured as master and slave earth stations 72 and 76, respectively. While two earth stations are illustrated, it is understood that any number of earth stations may be within the field of view of the common satellite 74. All earth stations which communicate via satellite 74 may be considered to represent an earth station sharing subsystem within which a single earth station is assigned as the master station and all remaining earth stations are assigned as slave stations with respect to communications links passing through satellite 74.

As explained above, each earth station may communicate with more than one satellite. Accordingly, an earth station may represent a master station with respect to a first satellite while operating as a slave station with respect to a second satellite.

In the example of FIG. 7, station 72 has been assigned as the master earth station and as such, maintains a closed synchronization loop (as explained above in connection with FIGS. 1–3) with the user terminal 70. Thus, the master earth station 72 adjusts the timing and frequency of the user terminal 70 until synchronous with the master earth station's timing and frequency reference signals. At predefined times throughout processing, the slave earth station 76 transmits a synchronization update request along feeder link 80 to the user terminal 70.

The user terminal 70 includes two receivers and at least one transmitter. Thus, the user terminal 70 may receive RF signals upon two separate forward channels. The user terminal 70 receives the update request from slave earth station 76 via the second receiver, without interfering with the forward link 78 with master earth station 72. The request instructs the user terminal 70 to perform a differential timing and frequency measurement between the forward links 78 and 80 of the master and slave earth stations 72 and 76.

To effect this measurement, the user terminal 70 passes a communications frame received upon forward link 78 to a master demodulator 82 and passes a communications frame received upon forward link 80 to slave demodulator 84. The master demodulator 82 compares the received master synchronization waveform with a stored synchronization waveform to determine timing and frequency differences therebetween. The slave demodulator 84 compares the received slave synchronization waveform with a reference synchronization waveform to obtain timing and frequency offset signals therebetween. Optionally, these timing and frequency differences may simply represent the timing and frequency error offset signals (as explained above in connection with FIG. 3).

The demodulated master and slave timing and frequency waveform signals are passed to a comparator which obtains differences therebetween. The differential timing and differential frequency obtained by comparator 88 are passed to modulator 86 and transmitted upon the return link go. The slave earth station 76 monitors the return link 90 to obtain this differential timing and frequency information along line 91. Thereafter, the slave earth station 76 adjusts its forward link timing and frequency reference signals based on the differential timing and frequency measurements received on line 91. In this manner, signals passed along forward link 80 become synchronized at the user terminal 70 with signals passed along forward link 78.

The slave earth station 76 includes a modulator 92 which transmits along link 80 The modulator operates based on a carrier frequency generated by the frequency generator go and based upon a timing signal generated by the timing generator 96. The frequency and timing generators 94, 96 are set based on the differential timing and frequency measurements transmitted by the user terminal 70 and monitored along link 91.

According to the above embodiments, forward and return link synchronization with earth station sharing are achieved by assigning one earth station as the master and the remaining earth stations viewed from a common satellite as slaves. The slave earth stations align their forward and return links relative to the master earth station's forward and return links to maintain synchronization at the common user terminal While multiple common user terminals may be used, only one of the common user terminals need be monitored by the slave earth station to maintain synchronization with the master earth station. This process is repeated at a rate consistent with the dynamic effects being tracked and the required level of accuracy.

While some preferred embodiments of the invention have been described in detail, these are to be considered exemplary only and not as limitations on the scope of the invention.

We claim:

1. A method for maintaining synchronous communications in a satellite based telecommunication system between a user terminal and at least two earth stations, the method comprising the steps of:

assigning one earth station as a master earth station and one earth station as a slave earth station;

transmitting from a user terminal a communications frame along a return link to the master earth station, said frame including a synchronization signal;

monitoring said return link at the slave earth station to obtain said frame;

calculating a synchronization offset between said synchronization signal received in said frame and a reference synchronization signal of the slave earth station; and updating said reference synchronization signal of the slave earth station based on said synchronization offset to synchronize the slave earth station with the master earth station.

2. A method according to claim 1, further comprising the step of inserting a timing code into a header section of said frame, said synchronization signal including said timing code, said synchronization offset including a timing offset used by said slave earth station to advance or retard a timing of a reference timing signal in said reference synchronization signal.

3. A method according to claim 1, wherein said frame is transmitted in a predefined subband having a center frequency defined by the master station, said synchronization signal and offset including frequency signal and offset components, respectively, wherein said step of updating includes shifting said reference frequency signal of the slave earth station, associated with the current user terminal, until said reference frequency aligns with a carrier frequency assigned by the master earth station to the associated user terminal.

4. A method according to claim 3, wherein said frame and synchronization signal includes a CDMA code and wherein said updating step synchronizes said slave earth station based on a timing and frequency of said CDMA code.

5. A method according to claim 1, wherein said transmitting step includes transmitting multiple frames from multiple user terminals superimposed upon one another in a spread spectrum manner, each frame having a unique orthogonal code associated with a corresponding transmitting user terminal.

6. A subsystem in a satellite based telecommunications system for maintaining at least one synchronous communications link between a set of user terminals and at least two earth stations communicating with said user terminals via a single communications satellite, said subsystem comprising:

at least two earth stations, one of said earth stations being designated as a master earth station and the remaining earth stations being designated as slave earth stations;

at least one user terminal assigned to said master earth station, said user terminal communicating synchronously with said master earth station over at least one of a forward link and am return link;

a test module for determining a difference in at least one of a timing and a frequency between reference timings and frequencies of said master and slave earth stations; and a control module for adjusting at least one of said reference timing and frequency of said slave earth station based on said difference to synchronize said slave earth station with said master earth station.

7. A subsystem according to claim 6, wherein said slave earth station includes a modulator for transmitting a synchronization request to said user terminal; and wherein said user terminal includes a discriminator for measuring a synchronization difference between frames received by said user terminal from said slave and master earth stations.

8. A subsystem according to claim 6, wherein said earth station includes said adjustment module for correcting a synchronization of said slave earth station to align with a synchronization of said master earth station based on said difference in said at least one of timing and frequency.

9. A subsystem according to claim 6, wherein said slave earth station includes a module for monitoring a return link between said user terminal and said master earth station to obtain a frame transmitted therealong, said frame including a synchronization signal representative of a reference timing and frequency of said master earth station, said slave earth station determining said difference based on said synchronization signal.

10. A subsystem according to claim 6, wherein said slave earth station updates timing and frequency of a forward link between said slave earth station and said user terminal based on a synchronization signal obtained from a frame transmitted from said user terminal to said master earth station.

11. A subsystem according to claim 6, wherein said at least one user terminal includes a generator for generating a unique signature waveform to be embedded in a plurality of telecommunications data frames.

12. A subsystem according to claim 6, wherein said at least one user terminal includes an oscillator for generating a carrier frequency, said at least one user terminal outputting a plurality of telecommunications data frames in a subband centered about said carrier frequency.

13. A subsystem according to claim 6, wherein said at least one user terminal modulates a CDMA code with communications data in a data section of a plurality of telecommunications data frames and inserts a timing synchronization code into a header section of said frames, said timing synchronization code being orthogonal with respect to, and unique from, timing synchronization signals associated with other user terminals.

14. A subsystem according to claim 6, wherein said test module further includes timing and frequency discriminators for comparing said at least one of a timing and a frequency with said reference timings and frequencies to obtain timing and frequency offset errors corresponding to said difference.

15. A method for maintaining synchronous forward communications links in a satellite based telecommunications system from master and slave earth stations to a common user terminal, the method comprising the steps of:

assigning one earth station as a master earth station and at least one earth station as a slave earth station;

transmitting a synchronization request to the user terminal;

measuring a synchronization difference between frames transmitted from the master and slave earth stations and received by the user terminal;

aligning a reference synchronization of the slave earth station with a reference synchronization of the master earth station based on said synchronization difference.

16. A method according to claim 15 wherein the slave earth station transmits said synchronization request.

17. A method according to claim 15, further comprising the step of transmitting said synchronization difference from the user terminal over a return link to the master station, the slave earth station monitoring said return link to obtain said synchronization difference and, thereafter, performing said connecting step.

18. A method according to claim 15, wherein said synchronization difference includes timing and frequency differential components.

19. A method according to claim 15, wherein said measuring step is based on orthogonal codes in said frames received by the user terminal.

20. A method for maintaining at least one synchronous communications link between a set of user terminals and at least two earth stations communicating with said user terminals via a single common satellite in a satellite based telecommunications system, the method comprising the steps of:

designating one of said earth stations as a master earth station and the remaining earth stations as slave earth stations;

assigning at least one user terminal to said master earth station, said user terminal communicating synchronously with said master earth station over at least one of a forward link and a return link;

determining a difference in at least one of timing and frequency between reference timings and frequencies of said master and slave earth stations; and adjusting at least one of timing and frequency of said slave earth station based on said difference to synchronize said slave earth station with said master earth station.

21. A method according to claim 20, wherein said slave earth station includes a modulator for transmitting a synchronization request to said user terminal; and wherein said user terminal includes a discriminator for measuring a synchronization difference between frames received by said user terminal from said slave and master earth stations.

22. A method according to claim 20, wherein said earth station includes said adjustment module for correcting a synchronization of said slave earth station to align with a synchronization of said master earth station based on said difference in said at least one of timing and frequency.

23. A method according to claim 20, wherein said slave earth station includes a module for monitoring a return link between said user terminal and said master earth station to obtain a frame transmitted therealong, said frame including a synchronization signal representative of a reference timing and frequency of said master earth station, said slave earth station determining said difference based on said synchronization signal.

24. A method according to claim 20, wherein said slave earth station updates timing and frequency of a forward link between said slave earth station and said user terminal based on a synchronization signal obtained from a frame transmitted from said user terminal to said master earth station.

* * * * *